United States Patent [19]
Pink

[11] Patent Number: 5,644,844
[45] Date of Patent: *Jul. 8, 1997

[54] FILAMENT TRIMMER

[75] Inventor: Anthony N. Pink, Shorewood, Minn.

[73] Assignee: The Toro Company, Minneapolis, Minn.

[*] Notice: The term of this patent shall not extend beyond the expiration date of Pat. No. D369,364.

[21] Appl. No.: 193,368

[22] Filed: Feb. 8, 1994

Related U.S. Application Data

[63] Continuation-in-part of Ser. No. 11,342, Aug. 2, 1993, Pat. No. Des. 369,364.

[51] Int. Cl.⁶ .................................................. A01D 50/00
[52] U.S. Cl. .................. 30/276; 30/347; 56/12.7; 248/52; 16/114 B
[58] Field of Search ................ 30/276, 347; D8/8; D15/16; 24/129 A; 16/114 B; 248/52; 56/12.7, 295

[56] References Cited

U.S. PATENT DOCUMENTS

| | | |
|---|---|---|
| D. 305,198 | 12/1989 | White et al. . |
| D. 333,825 | 3/1993 | Price .................................. D15/133 |
| 2,795,095 | 6/1957 | Kaufman ............................ D8/8 |
| 4,047,299 | 9/1977 | Bair .................................... 30/276 |
| 4,578,863 | 4/1986 | Laverick ............................. 30/276 |
| 4,858,271 | 8/1989 | Berfield et al. . |
| 4,860,451 | 8/1989 | Pilatowicz et al. . |
| 5,318,158 | 6/1994 | Seasholtz ............................ 248/52 |
| 5,330,138 | 7/1994 | Schlessmann .................... 248/52 |

OTHER PUBLICATIONS

Black & Decker Instruction Manual, Bump Feed Yard Trimmers Models 82314, 82316, dated 1989.
Paramount Owner's Manual, Weed & Grass Trimmer, Models PT140, PT162, dated 1989.
Sears Operator's Manual, Electric Trimmer, dated Jan. 26, 1993.
Ikra Trimmer Brochure, Models 2004, 6007, 7001, dated 1991.
Photographs showing Ikra 8007 Trimmer, undated.
Toro Owner's Manual for the 1410 Trimmer, dated 1989.
Paramount Power Grooming Tools Brochure, dated 1988.
K&S Owner's Manual for Electric Grass Trimmers, dated 1984.

*Primary Examiner*—Rinaldi I. Rada
*Assistant Examiner*—Elizabeth Stanley
*Attorney, Agent, or Firm*—James W. Miller

[57] ABSTRACT

A filament trimmer comprises a lower housing, an upper handle and a single handle tube connecting the two together to form a completed trimmer. The handle tube has approximately the same length as the length of the lower housing, and the upper handle has approximately the same width as the lower housing, to allow the three-part construction of the trimmer to be packaged in a box of minimum size. The upper end of the lower housing has an S-shaped cord channel, with an adjacent open chamber or space next to and below the cord channel, such that the electrical cord passing downwardly into the lower housing from the handle tube will naturally form a downwardly protruding loop that is easily received in the lower housing when the handle tube is pushed down into the lower housing during assembly. Finally, an extension cord lock is provided on the upper handle comprising an opening in the hand grip forming members of the handle that leads into the hand grip space along with an integral hook that is molded in the interior of the hand grip space by being integrally formed on one of the hand grip forming members. A doubled over portion of the extension cord is pushed through the opening and hooked or looped over the hook to comprise the cord lock.

13 Claims, 3 Drawing Sheets

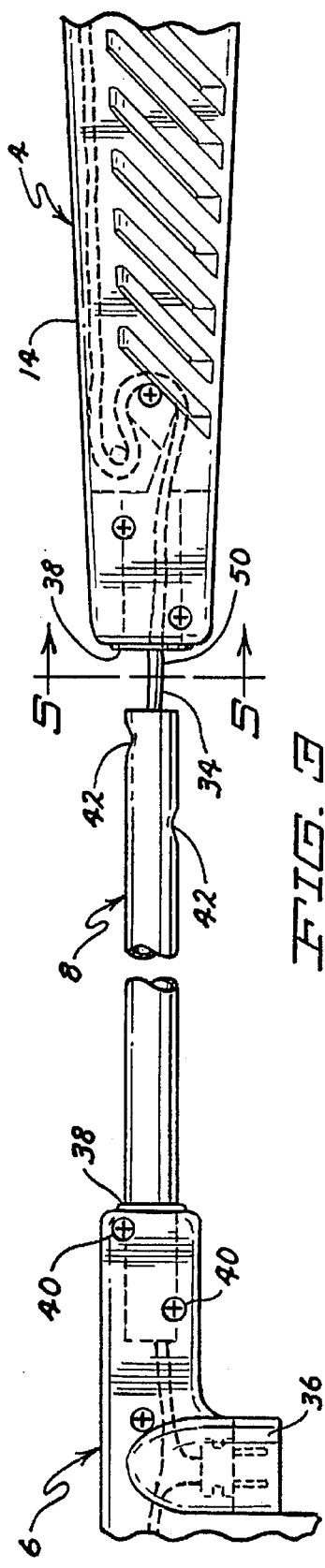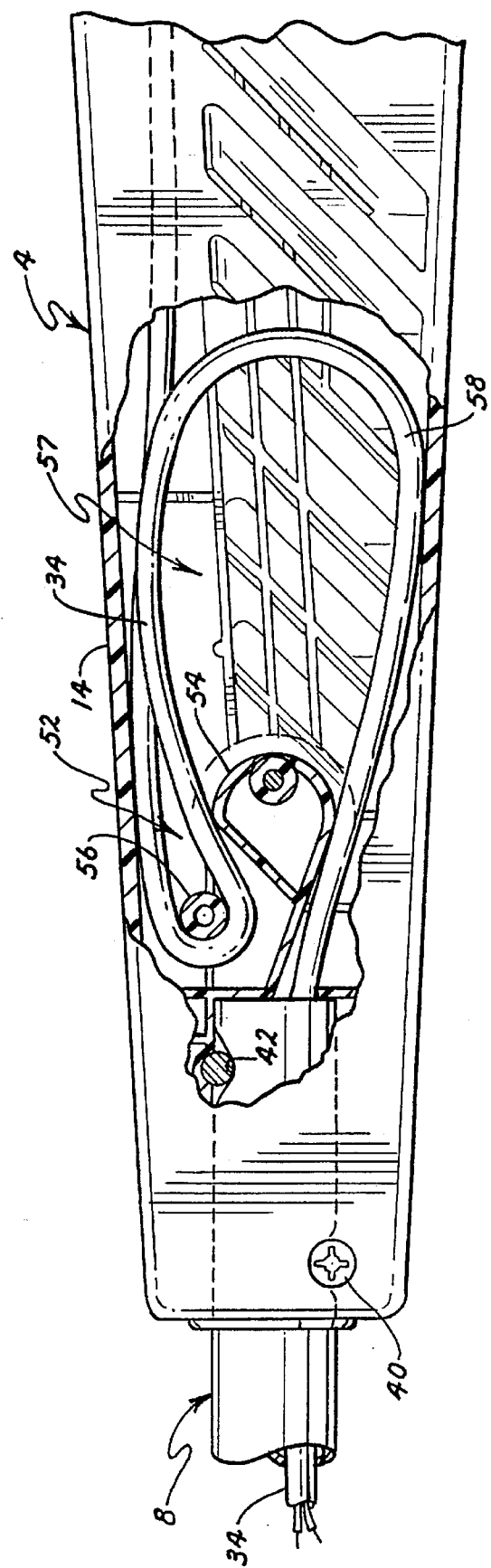

FILAMENT TRIMMER

CROSS REFERENCE TO RELATED APPLICATIONS

This application is a continuation-in-part of the Design Patent Application Ser. No 29/011,342, filed Aug. 2, 1993, now Des. Pat. No. D369,364.

TECHNICAL FIELD

This invention relates to a hand-held filament trimmer having a flexible filament line for severing grass, weeds or the like, and more particularly to an electrically powered filament trimmer having a lower housing, an middle handle tube, and an upper handle.

BACKGROUND OF THE INVENTION

Electrically powered filament trimmers are well known devices used for cutting grass, weeds or the like. Such trimmers comprise hand-held implements which are held by a standing operator with the lower end of the trimmer adjacent the ground. A filament trimmer head rotatably mounted on the lower end of the trimmer stores a supply of flexible filament line. When the trimmer head is rotated about a substantially vertical axis by an electric motor contained in a lower housing, an outwardly extending free end of the line is stiffened by centrifugal force and is effective to cut grass, weeds or the like at a height of cut determined by how closely the operator positions the lower end of the trimmer adjacent the ground.

Electrically operated trimmers of this type are manufactured in a partially broken down form that must be assembled by the user prior to the first use of the trimmer. For example, one or more handle tubes typically comprise the middle section of the trimmer connecting a lower housing and an upper handle. The lower housing typically mounts the electric motor that powers the filament trimmer head, and an electrical cord runs from this motor upwardly through the handle tube(s) to the upper handle to terminate in an electrical plug. The operator generally has to assemble the handle tubes together if more than one is provided, and has to insert the top and bottom ends of the handle tubes into the upper handle and lower housing to assemble the components of the trimmer and make an operative unit.

While the use of separate disassembled components allows prior art trimmers to be packaged in boxes that are smaller than the overall height or length of the trimmer, the trimmers known to date have not attempted to configure such components to minimize the size of the box. For example, if a single handle tube is used extending between the lower housing and upper handle, this handle tube is usually considerably longer than either the lower housing or upper handle, with the end result that the minimum length of the box has to conform to the overall length of the handle tube. Accordingly, the box sizes in which many prior art trimmers are packaged for shipment and sale, even for trimmers that are broken down into separate components, are generally larger than is desirable. This is a disadvantage given the space constraints that most merchants face for storing such products prior to sale or in the retail selling area.

The box size can be potentially decreased by making the middle handle tube in more than one section. However, this requires that such separate handle tube sections be aligned end to end and secured together as part of the assembly process. This increases the effort required to assemble the trimmer. Also, any fasteners passing through the handle tubes could possibly damage the electrical wiring. Thus, the use of a handle tube made from multiple sections is not considered to be as desirable as a single handle tube.

Another problem known with prior art filament trimmers involves the electrical cord that runs down through the handle tube to carry electrical power to the electric motor mounted in the lower housing. Even when the components of the trimmer are in their disassembled state, this cord is still intact and is simply bent as it extends from one disassembled component to the next. When the handle tube is inserted down into the lower housing, the extra length of cord needed to span between the components when they are disassembled has to be pushed down into the lower housing during the insertion process to hide the extra cord length inside the lower housing when the trimmer is fully assembled. This extra cord length can be up to 6 or 8 inches, or possibly even more, depending on how much the components are spaced apart when they are disassembled.

It can be difficult in most known trimmers to push or stuff this extra cord length into the lower housing. The cord does not travel down into the lower housing in a controlled manner, and can kink or bend prior to all of the extra cord length having been received in the lower housing. Since the kink will often occur inside the lower housing where it can't be reached, this often results in the trimmer being returned by the buyer to the dealer with the complaint that the trimmer can't be assembled. In addition, if the operator is not careful during this process, he or she can damage the cord. Thus, the known assembly process is difficult at best and can result in damage to the cord even prior to use of the trimmer, requiring that the cord be replaced. Obviously, this is a disadvantage of known trimmers.

An extension cord is typically used to extend from the electrical plug on the trimmer to a fixed electrical power outlet to carry electrical power to the trimmer during use. Since such extension cords are often quite long, e.g. 50 or even 100 feet, a considerable drag force, arises from the weight of such a long cord as well as its being dragged along the ground. This drag force tends to pull the cord out of the plug.

To help overcome this problem, many prior art trimmers have incorporated various devices for helping to lock the extension cord to the trimmer, usually simply by carrying most of the weight of the cord, in an attempt to keep the extension cord in place. However, most prior art cord locks known to the Applicants are difficult or inconvenient to use, or add additional parts, and thus additional expense, to the trimmer.

SUMMARY OF THE INVENTION

This invention provides a filament trimmer that is directed to solving the various problems noted above. The filament trimmer of this invention has one aspect directed to allowing the trimmer to be packaged in a shipping package of minimum size. This is accomplished in a filament trimmer which comprises three primary interconnected parts comprising a lower housing, an upper handle and a single handle tube connecting the lower housing and upper handle together to form a completed trimmer. A filament trimmer head carrying an outwardly extending length of filament line is rotatably carried on a lower end of the lower housing. The lower housing when laid flat has a predetermined length comprising the orthogonal distance between an upper end of the lower housing and a forwardmost point at a lower end of the lower housing and a predetermined width comprising the orthogonal distance between an upper face of the lower housing and a lowermost point of the lower housing. The single handle tube has approximately the same length as the predetermined length of the lower housing, and the upper handle has approximately the same width as the predetermined width of the lower housing, thereby to allow the three-part construction of the trimmer to be packaged in a box having length and width dimensions only slightly larger than the predetermined length and width of the lower housing.

Another aspect of this invention is directed to structure for allowing the internal electrical cord to be easily inserted into the lower housing when the handle tube is connected thereto. This is accomplished in a filament trimmer which comprises a lower housing, an upper handle and at least one elongated handle tube connecting the lower housing and upper handle together to form a completed trimmer. A filament trimmer head carrying an outwardly extending length of filament line is rotatably carried on a lower end of the lower housing. Electrical motor means is carried in the lower housing for rotating the filament trimmer head. A means is provided for supplying electrical power to the motor means which includes an electrical cord extending down through at least a portion of the handle tube and into the lower housing for connection to the motor means. The upper end of the lower housing has an S-shaped cord channel, with an adjacent open chamber or space next to and below the cord channel, such that the electrical cord passing downwardly into the lower housing from the handle tube will naturally form a downwardly protruding loop that is easily received in the lower housing when the handle tube is pushed down into the lower housing during assembly.

Yet another aspect of this invention is directed to a simple, durable, inexpensive and easily usable cord lock for the extension cord that is typically connected to a filament trimmer. This comprises means carried on the upper handle for locking an extension cord to an electrical plug on the trimmer to connect the plug to a remotely located electrical outlet. The cord lock means comprises a hand grip in the upper handle comprising a hand grip space for receiving an operator's hand while holding the trimmer by the handle, the hand grip space being formed by and being bounded by a plurality of interconnected members. An opening is provided in the hand grip forming members that leads into the hand grip space with such opening being large enough to receive a doubled over portion of the extension cord. A hook is also contained in the hand grip space and pointing in a direction away from the opening to allow a loop formed by the doubled over portion of the extension cord to be hooked and retained thereon with the extension cord having a tail leading from the doubled over portion to be connected into the electrical plug.

BRIEF DESCRIPTION OF THE DRAWINGS

This invention will be described hereafter in the Detailed Description, taken in conjunction with the following drawings, in which like reference numerals refer to like elements or parts throughout.

FIG. 3 is a partial side elevational view of a portion of the trimmer shown in FIG. 1, particularly illustrating the trimmer components shown in FIG. 2 being assembled into a completed trimmer with the handle tube already having been installed into the upper handle but prior to the insertion of the handle tube into the lower housing;

FIG. 4 is an enlarged, partial side elevational view of a portion of the trimmer shown in FIGS. 1 and 4, with a portion thereof being broken away for the purpose of clarity, particularly illustrating the S-shaped cord receiving channel and adjacent cord receiving space in the upper end of the lower housing which eases the task of inserting the handle tube and electrical cord into the lower housing;

DETAILED DESCRIPTION

Figure 1:
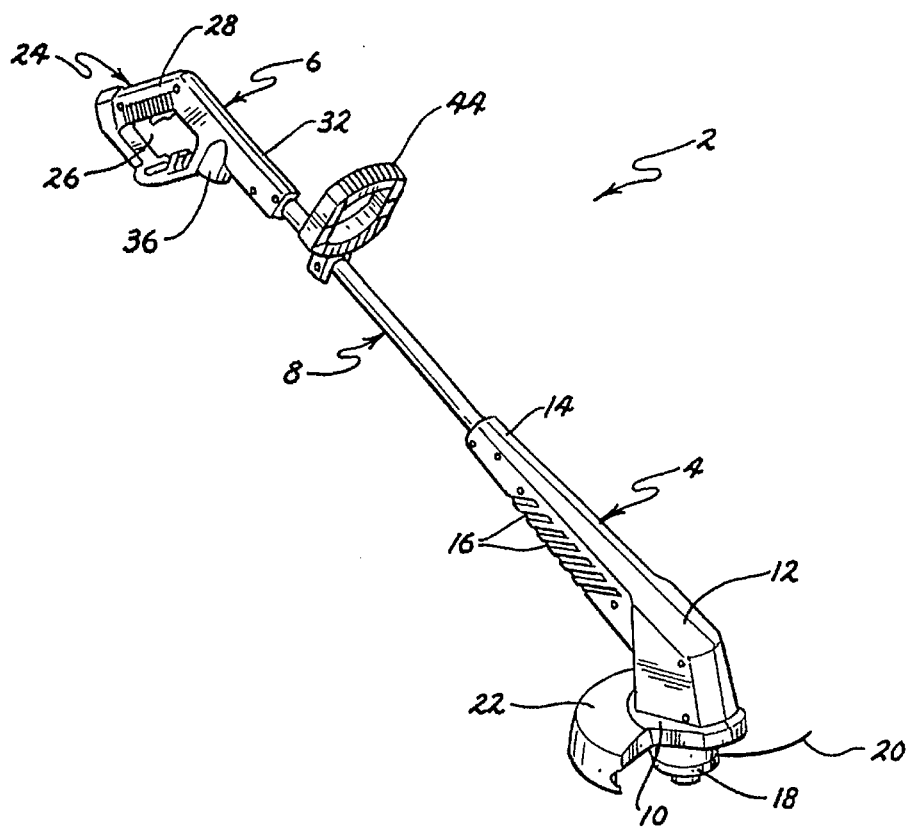
FIG. 1 is a perspective view of a filament trimmer according to this invention.

Referring first to FIG. 1, the filament trimmer of this invention, generally illustrated as 2, includes a lower housing 4, an upper handle 6, and a single, middle handle tube 8 that connects lower housing 4 and upper handle 6 together to form an assembled trimmer. One aspect of this invention is the relative sizes of these three major components of trimmer 2 which allows their packaging into an extremely small box.

Lower housing 4 comprises a substantially horizontal lower flange 10, a vertical motor containing portion 12, and an inclined, upwardly extending post or column 14 having a number of vents 16 thereon. An electric motor (not shown) is enclosed inside the motor containing portion 12 of lower housing 4 with its motor shaft extending vertically downwardly to protrude beneath the top surface of lower flange 10. A filament trimmer head 18 containing a supply of flexible filament line is secured to the motor shaft to be rotated about a generally vertical rotational axis when the electric motor is operated. When so rotated, the free end 20 of the filament line, which protrudes outwardly from head 18, is spun around in a substantially horizontal cutting plane to cut grass, weeds, or the like. A semi-circular shield 22 is carried on the rear half of lower flange 10 to protect the operator from flying debris.

Upper handle 6 includes a generally horizontal hand grip 24 having an enclosed opening 26 sized to receive one of the operator's hands. Hand grip 24 includes a top grip 28 around which the operator can close his hand to grip handle 6. A trigger switch 30 is mounted on the underside of top grip 28 to be easily accessible to the operator so that he or she can easily close such switch while holding onto hand grip 24. Handle 6 further includes a downwardly extending post or column 32 which is designed to point towards the upwardly extending post or column 14 on lower housing 4 when the components of trimmer 2 are assembled together.

Handle tube 8 comprises a simple, rigid cylindrical tube that extends between lower housing 4 and upper handle 6 to connect the two together and form a generally assembled trimmer 2. Tube 8 is hollow to allow an electrical power supply cord 34 to pass downwardly through tube 8 from a male electrical plug 36 contained on upper handle 6 to the electric motor carried in lower housing 4. The ends of the posts or columns 14 and 32 on lower housing 4 and upper handle 6 have circular openings 38 for allowing the opposed ends of handle tube 8 to be inserted when assembling trimmer 2, as will be described in more detail hereafter. A plurality of attachment screws 40 pass inwardly through lower housing 4 and upper handle 6 to grip against crimped portions 42 in the outside diameter of handle tube 8 to secure handle tube 8 to lower housing 4 and upper handle 6 in a manner generally known in the art. Thus, none of the attachment screws 40 come into close proximity with any of the electrical wiring contained inside tube 8. See FIG. 3.

Figure 2:
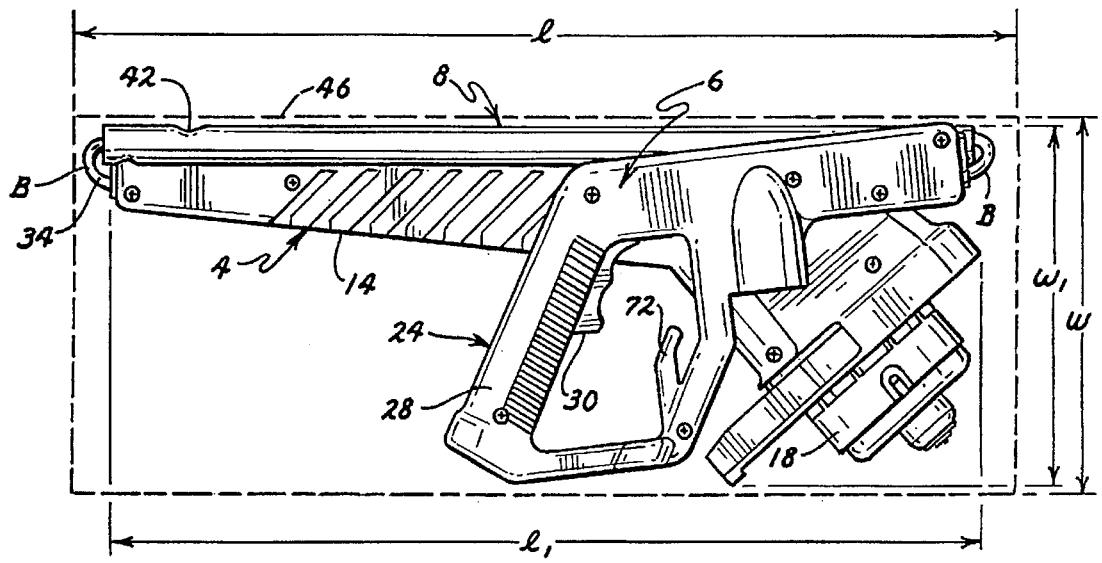
FIG. 2 is a plan view of the three major components of the filament trimmer shown in FIG. 1, namely of the lower housing, the handle tube and the upper handle, particularly illustrating such components in an unassembled form packed in a shipping box.
Figure 5:
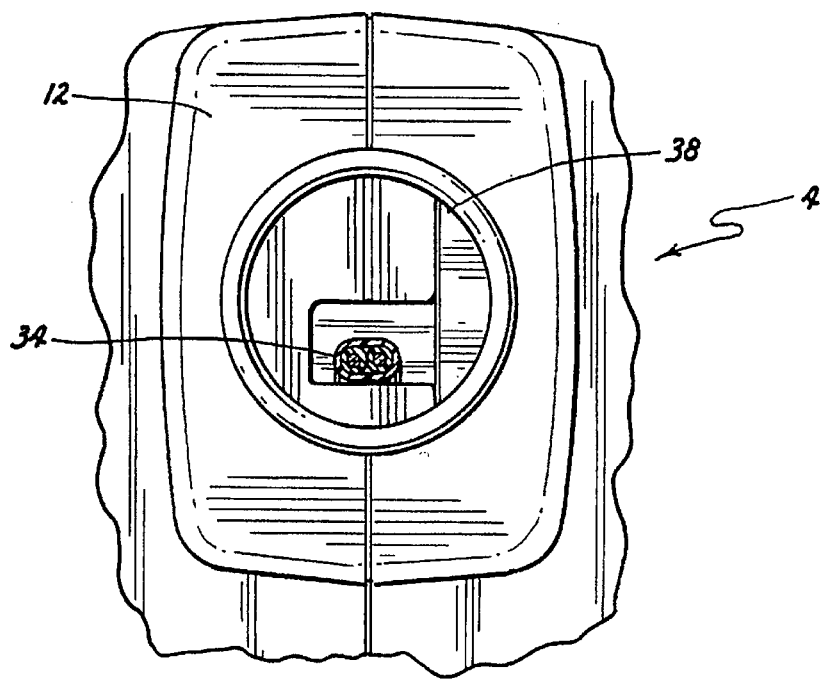
FIG. 5 is a cross-sectional view of the trimmer shown in FIG. 1, taken along lines 5—5 in FIG. 4.

In trimmer 2 according to this invention, the three major components of trimmer 2 as just described, namely lower housing 4, upper handle 6 and handle tube 8, are very carefully sized to allow them to be packaged inside a very small box. FIG. 2 shows these components as they are shipped from the factory in such a box. Lower housing 4, handle tube 8 and upper handle 6 are all pre-manufactured in the factory and packed in the shipping box in broken down form with these components not being directly secured together. However, the electrical supply cord 34 that is internal to trimmer 2 runs down from upper handle 6, through handle tube 8 and down to lower housing 4 even in this unassembled state with the cord 34 bending around to extend between the unassembled components as shown by the bends B in cord 34 in FIG. 2. The purchaser of trimmer 2 has to remove these components from the box, straighten them out relative to one another, then insert handle tube 8 into both lower housing 4 and upper handle 6 to form trimmer 2 shown in FIG. 1, and finally securing all the components together into an operative trimmer using attachment screws 40. After the three major components of trimmer 2 are assembled in this fashion, a second auxiliary handle 44 can be clamped to handle tube 8 at a desired vertical location. In addition, shield 22 is then secured to the lower flange 10 of lower housing 4. Auxiliary handle 44 and shield 22 are simply shipped loose within the shipping box and are not shown in the box in FIG. 2 for the sake of clarity. Referring now to FIG. 2, lower housing 4 is shown as having a predetermined length 11 and a predetermined width $w_1$. The length 11 is measured as shown in FIG. 2 with lower housing 4 laid flat in the box and comprises the orthogonal distance between the upper end of lower housing 4 and the forwardmost point at the lower end of lower housing 4 when lower housing 4 is so received. The width $w_1$ is measured as shown in FIG. 2 with lower housing 4 laid flat in the box and comprises the orthogonal distance between the upper face of post or column 14 and a lowermost point at the rear of lower flange 10. The shipping box is arranged to have an overall length l and an overall width w just slightly greater than the length $l_1$ and width $w_1$ of lower housing 4. The shipping box is illustrated as 46 in phantom in FIG. 2.

With lower housing 4 dimensioned as shown, the length of handle tube 8 is selected to be approximately the same as the length $l_1$ of lower housing 4 so that handle tube 8 can be packed into the box adjacent lower housing 4 with handle tube 8 simply conforming to the length $l_1$ of lower housing 4. In fact, handle tube 8 is about 0.25 inches shorter than the length $l_1$ of lower housing 4 with such a small difference being included within the meaning of the phrase "approximately the same as". The width of upper handle 6 is selected to be approximately the same as the width $w_1$ of lower housing 4 so that handle 6 can then be packed into the box overlying both lower housing 4 and handle tube 8. With these configurations, neither handle tube 8 nor upper handle 6 cause shipping box 46 to vary in size from that required for lower housing 4 since they do not exceed either the length $l_1$ or width $w_1$ limitations of lower housing. As noted earlier, auxiliary handle 46 and grass shield 22 are packed loose within the remaining open spaces in box 46 and are not shown in FIG. 2.

This three part construction of trimmer 2, with a lower housing 6, a single handle tube 8 and an upper handle 10, and by apportioning the length and widths of the various components as just described, allows trimmer 2 to be packed into a very small box 46. For a trimmer with an overall vertical height that is sufficient to be held by an upright person of average height, the entire trimmer can be packed into a box 46 having a length l of 20 inches, a width w of 7.875 inches and a depth of 6.25 inches. This is an extremely small box 46 for such a trimmer, previously unknown in the art, and is highly advantageous due to the economy of stacking and storing large numbers of such trimmers, both at the wholesale and retail level.

Another unique aspect of trimmer 2 of this invention is the cord handling ability of lower housing 4. This comes into play when it is necessary to insert handle tube 8 into lower housing 4 during assembly of trimmer 2. As shown in FIG. 3, this requires that the extra cord length 50 extending out of the lower end of handle tube 8 be stuffed or inserted into lower housing 4 when handle tube 8 is pushed into place in lower housing 4. FIG. 3 shows handle tube 8 prior to such insertion with the extra cord length 50 extending partly out of lower housing 4, while FIG. 4 shows handle tube 8 having been inserted and secured in place by attachment screws 40.

Trimmer 2 according to this invention includes means 52 for defining an S-shaped cord receiving channel in the upper end of lower housing 4 immediately adjacent the reception area for handle tube 8. This S-shaped channel is formed by a rounded, downwardly facing bearing surface 54 and an upper post or pin 56 spaced to one side of bearing surface 54. Cord 34 is looped to pass downwardly around bearing surface 54 and to extend back upwardly up and around the spaced pin 56 before continuing back downwardly to its connection with the electric motor. Prior to insertion of handle tube 8 into lower housing 6, cord 34 is quite tightly received against this S-shaped cord receiving channel with cord 34 being tightly looped around curved bearing surface 54. See FIG. 3.

The interior cross-sectional area of lower housing 4 immediately below bearing surface 54, and extending downwardly for a length sufficient to accommodate extra cord length 50, is unobstructed across the width of lower housing 4. This forms a reception area 57 for extra cord length 50. When handle tube 8 is inserted downwardly into lower housing 4, the natural shape of the lower loop 58 of the S-shaped bend in cord 34, i.e. the loop provided by the downwardly facing curved bearing surface 54, causes cord 34 to simply expand into a bigger loop which is easily received in the unobstructed reception area 57 of lower housing 4. This is shown in FIG. 4 which illustrates the large loop 58 of cord formed by the amount of extra cord length 50 that is pushed down into lower housing 4 when handle tube 8 is inserted into lower housing 4. The absence of any obstructions in reception area 57 of lower housing 4 allows this loop 58 to easily form and extend down into lower housing 4 when handle tube 8 is inserted into lower housing 4. Thus, the task of assembling trimmer 2 is considerably eased, and the extra cord length 50 will easily move into lower housing 4, simply by pushing down on handle tube 8 to insert the lower end thereof into lower housing 4.

A final aspect of this invention comprise a unique cord lock 60 for locking the female end 62 of an extension cord 64 onto trimmer 2 to prevent cord 64 (shown in phantom in FIG. 6) from being easily pulled out of the electrical plug 36. This cord lock 60 is designed to be easy to use but without requiring any separate parts on trimmer 2. Cord lock 60 is simply integrally molded into upper handle 6 of trimmer 2 as part of the molding process used to form upper handle 6. As such it can be provided at no additional cost and is quite durable and reliable in operation.

Figure 6:
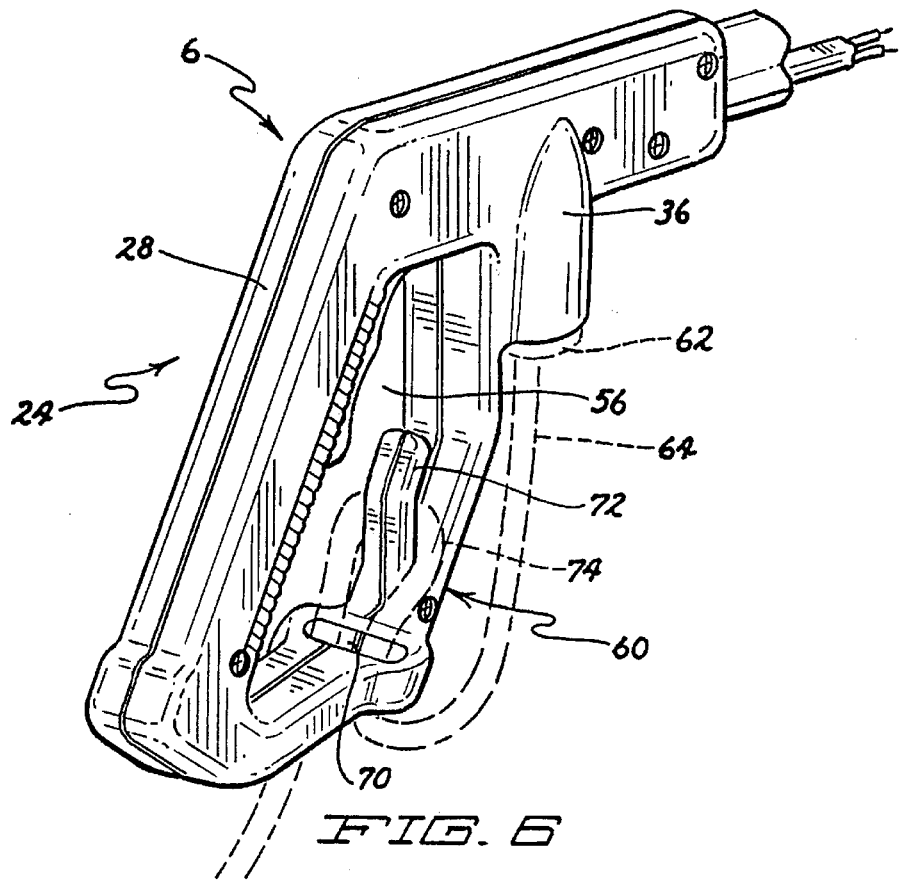
FIG. 6 is a perspective view of the upper handle of the trimmer shown in FIG. 1, particularly illustrating the cord lock which helps retain a typical electrical extension cord on the trimmer to carry power from an external electrical outlet to an electrical male plug carried on the upper handle of the trimmer.

Cord lock 60 of this invention comprises an entrance opening 70 into the interior, hand receiving opening 26 of hand grip 24 and a hook 72 that is integrally formed with hand grip 24 inside opening 26. As shown in FIG. 6, entrance opening 70 is rectangularly shaped to be slightly wider than a doubled width of extension cord 64 and is preferably provided in a rear or bottom wall of hand grip 24. Hook 72 is located adjacent entrance opening 70 and extends forwardly relative to hand grip 24 and relative to entrance opening, i.e. in a direction that points away from entrance opening 70. Hook 72 is preferably integrally molded into a rear or bottom wall of hand grip 24.

In using cord lock 60, an extension cord 64 is typically used to extend between trimmer 2 and an external electrical outlet (not shown) on an adjacent building or structure. Cord 64 has its female end 62 plugged into the male plug 36 provided on handle 6 of trimmer 2 with the male plug having the three typical prongs for a grounded electrical plug or the two typical prongs for a double insulated appliance. The user can grab cord 64 somewhat inwardly from its female end 62 and double the cord over. The doubled over cord portion can then be pushed through entrance opening 70 in hand grip 24 of handle 6 until it forms a loop 74 that is received in the enclosed hand receiving opening 26 of hand grip 24. This loop 74 at the doubled over portion of cord 64 can then be hooked onto the integrally formed hook 72 that is located in the interior of opening 26. The outwardly extending tail of cord 64, i.e. the tail containing the female end 62 of extension cord 64, can then be simply plugged into male plug 36 on hand grip 24. Thus, extension cord 64 is prevented from becoming unplugged during normal operation of trimmer 2 due to the cord loop 74 formed by the doubled over portion of cord 64 which is caught on hook 72. This helps carry the weight of cord 64 to prevent such weight from pulling female cord end 62 out of male plug 36.

Cord lock 60 of this invention is quite simple and durable, comprising simply an opening 70 and hook 72 that may be easily and inexpensively formed on hand grip 24. It is also extremely easy to use cord lock 60.

Referring to FIGS. 2, 3 and 6, electrical plug 36 is located on handle 6 ahead or in front of trigger switch 30 at the juncture between downwardly extending post or column 32 and a forward or bottom wall of hand grip 24. This shortens the length of wiring which is required and elimates having to route such wiring around trigger switch 30, thus easing manufacture of trimmer 2. Known prior art trimmers typically locate plug 36 behind trigger switch 30 at the back of handle 6.

Various modifications will be apparent to those skilled in the art. For example, hook 72 could be formed on the rear wall of hand grip 24 pointing upwardly, instead of being formed on the bottom wall of hand grip 24 pointing forwardly. However, it is preferred that hook 72 be on the bottom wall of hand grip 24 since hand receiving opening 26 is sufficiently deep to allow the user's hand to be received well above hook 72 such that hook 72 does not touch or intrude upon the user's hand. Thus, this invention is to be limited only by the scope of the appended claims.

We claim:

1. A filament trimmer, which comprises:
   (a) a lower housing and an upper handle connected to the lower housing for allowing an operator to position the lower housing adjacent the ground while holding the upper handle;
   (b) a filament trimmer head carrying an outwardly extending length of filament line which head is rotatably carried on a lower end of the lower housing;
   (c) electrical motor means for rotating the filament trimmer head;
   (d) means for supplying electrical power to the motor means which includes an electrical plug carried on the upper handle; and
   (e) means carried on the upper handle for locking an extension cord to the electrical plug to connect the plug to a remotely located electrical outlet, the cord lock means comprising:
      (i) a plurality of interconnected members which form a hand grip in the upper handle, wherein the hand grip forming members define a hand grip space for receiving an operator's hand when the operator holds the trimmer by the hand grip;
      (ii) an opening in the hand grip forming members extending from outside the hand grip space into the hand grip space; and
      (iii) a hook that protrudes inwardly into the hand grip space from at least one of the hand grip forming members such that the hook is contained within the hand grip space and points in a direction away from the opening to allow a loop formed by a doubled over portion of the extension cord to be hooked and retained thereon with the extension cord having a tail leading from the doubled over portion to be connected into the electrical plug on the upper handle.

2. A filament trimmer as recited in claim 1, wherein the opening is in a rear one of the hand grip forming members.

3. A filament trimmer as recited in claim 2, wherein the hook is located on a bottom one of the hand grip forming members and faces forwardly away from the opening formed on the rear hand grip forming member.

4. A filament trimmer as recited in claim 1, wherein the opening and hook are integrally molded as part of the hand grip forming members.

5. A hand-held outdoor power equipment unit, which comprises:
   (a) a body that includes an upper handle and a housing connected to the upper handle for allowing an operator to position the housing by holding the upper handle;
   (b) a powered implement carried on the body which performs a turf maintenance operation;
   (c) electrical motor means for powering the implement;
   (d) means for supplying electrical power to the motor means which includes an electrical plug carried on the upper handle; and
   (e) means carried on the upper handle for locking an extension cord to the electrical plug to connect the plug to a remotely located electrical outlet, the cord lock means comprising:
      (i) a plurality of interconnected members which form a hand grip in the handle, wherein the hand grip forming members define a hand grip space for receiving an operator's hand when the operator holds the outdoor power equipment unit by the hand grip;
      (ii) an opening in the hand grip forming members extending from outside the hand grip space into the hand grip space; and
      (iii) a hook that protrudes inwardly into the hand grip space from at least one of the hand grip forming members such that the hook is contained within the hand grip space and points in a direction away from the opening to allow a loop formed by a doubled over portion of the extension cord to be hooked and retained thereon with the extension cord having a tail leading from the doubled over portion to be connected into the electrical plug.

6. An outdoor power equipment unit as recited in claim 5, wherein the powered implement is carried on the housing.

7. An outdoor power equipment unit as recited in claim 6, wherein the powered implement is rotatably carried on a lower end of the housing.

8. An outdoor power equipment unit as recited in claim 7, wherein the powered implement comprises a filament trimmer head carrying an outwardly extending length of filament line.

9. A hand-held outdoor power equipment unit, which comprises:
 (a) a body that includes an upper handle and a housing connected to the upper handle for allowing an operator to position the housing by holding the upper handle, wherein the upper handle includes a hand grip space for receiving an operator's hand while holding the trimmer by the handle, the hand grip space being formed by and being bounded by a plurality of interconnected members;
 (b) a powered implement carried on the body which performs a turf maintenance operation;
 (c) electrical motor means for powering the implement;
 (d) means for supplying electrical power to the motor means which includes an electrical plug carried on the upper handle; and
 (e) means carried on the upper handle for locking an extension cord to the electrical plug to connect the plug to a remotely located electrical outlet, the cord lock means comprising:
  (i) a wall fixedly carried on the body with the wall containing an opening having a longitudinal, fore-and-aft axis that is parallel to a direction in which a cord loop formed by a doubled over portion of the extension cord may be pushed into and through the opening, wherein the wall that includes the opening is formed by at least one of the interconnected members that form the hand grip space;
  (ii) a hook fixedly carried on the body having a recess in which the cord loop is hooked to retain the cord loop with the recess extending between a closed end and an open end of the hook, the hook pointing in a direction directly away from the opening such that the recess extends substantially along and in line with the longitudinal, fore-and-aft axis of the opening, wherein the book is contained within the hand grip space; and
  (iii) wherein the hook and the opening are sufficiently unobstructed relative to one another such that motion of the cord loop in a first direction is effective to push the cord loop into and through the opening and over the hook and motion of the cord loop in a second direction opposite to the first direction is effective to hook the cord loop in the recess of the hook.

10. An outdoor power equipment unit as recited in claim 9, wherein the powered implement is carried on the housing.

11. An outdoor power equipment unit as recited in claim 9, wherein the powered implement comprises a filament trimmer head carrying an outwardly extending length of filament line which head is rotatably carried on a lower end of the housing.

12. An outdoor power equipment unit as recited in claim 11, wherein the housing comprises a lower housing that is connected to the upper handle by a discretely separate handle tube, and wherein the filament trimmer head is rotatably carried on a lower end of the lower housing.

13. An outdoor power equipment unit as recited in claim 9, wherein the recess has a length that is substantially larger than an outside diameter of the cord.

* * * * *

UNITED STATES PATENT AND TRADEMARK OFFICE
CERTIFICATE OF CORRECTION

PATENT NO. : U.S. Patent 5,644,844
DATED : July 8, 1997
INVENTOR(S) : Anthony N. Pink It is certified that error appears in the above-indentified patent and that said Letters Patent is hereby corrected as shown below:

In claim 9, "book" should read --hook-- at Column 10, line 13.

Signed and Sealed this

Sixteenth Day of September, 1997

Attest:

BRUCE LEHMAN

Attesting Officer

Commissioner of Patents and Trademarks